E. H. ANGIER.
PREPARING TIRES FOR SHIPMENT OR STORAGE.
APPLICATION FILED JAN. 11, 1918.

1,388,840.

Patented Aug. 30, 1921.

Inventor:
Edward H. Angier,
by Emery, Booth, Janney + Varney
Attys.

UNITED STATES PATENT OFFICE.

EDWARD H. ANGIER, OF FRAMINGHAM, MASSACHUSETTS.

PREPARING TIRES FOR SHIPMENT OR STORAGE.

1,388,840.   Specification of Letters Patent.   Patented Aug. 30, 1921.

Application filed January 11, 1918.   Serial No. 211,414.

*To all whom it may concern:*

Be it known that I, EDWARD H. ANGIER, a citizen of the United States, and resident of Framingham, in the county of Middlesex and Commonwealth of Massachusetts, have invented an Improvement in Preparing Tires for Shipment or Storage, of which the following description, in connection with the accompanying drawings, is a specification, like characters on the drawings representing like parts.

This invention relates to the preparation of tires for shipment or for storage and the purpose is to provide a very simple and inexpensive means of protecting them from deleterious influences.

My invention will best be understood by reference to the following description of a preferred embodiment thereof taken in connection with the accompanying drawings wherein:—

At the present time vehicle tires are commonly prepared for shipment or for storage by wrapping each one helically with a strip of paper. While this method of wrapping, if properly carried out, gives a sufficient protection to the tire, it obviously consumes much paper. At the time at which I make this application the price of paper is high and it may be anticipated that if the state of war continues steps will be taken to abridge the use of paper. In fact, dealers are already urged to avoid the use of wrapping for goods in boxes or similar packages. My invention provides a means for efficiently protecting the tire without the use of a large quantity of paper.

The exterior surface of the tire shoe is of itself of a resistant nature. The interior which is formed of fabric is much more delicate and if the fabric is injured the integrity of the tire is considerably diminished and moreover, this fabric will rot and be otherwise weakened by various liquids coming in contact with it which would not injure the rubber exterior.

Figure 1:
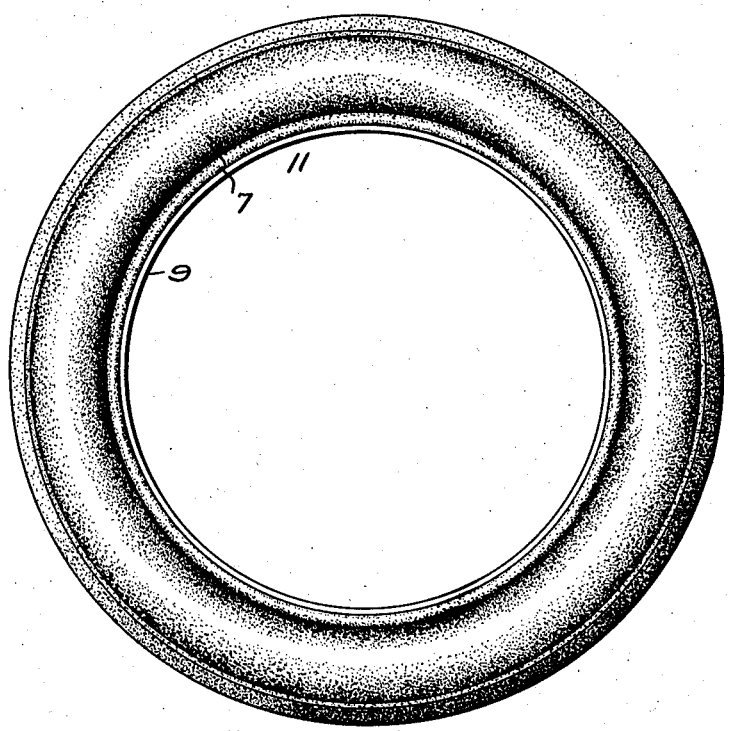
Figure 1 is a side elevation of a tire prepared for shipment.
Figure 2:
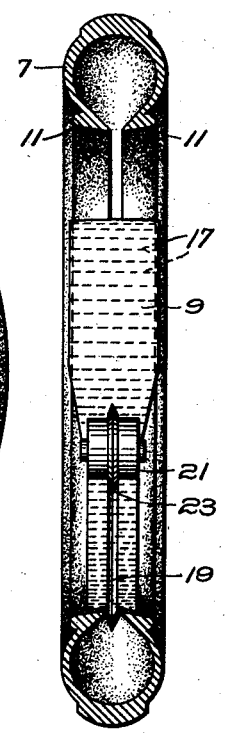
Fig. 2 is a diametrical section thereof showing the closure partially applied and also illustrating one suitable method of applying the same.

In accordance with my invention, as seen in Figs. 1 and 2, I provide for protecting the most vital parts of the tire 7 by closing off the interior thereof by means of a closure 9 extending between the beads 11 of the tire. This closure is formed of paper-like material, by which I mean to include paper, card and similar materials ordinarily used for wrapping purposes, and desirably is sealed to the beads 11 of the tire. To protect the interior of the tire thoroughly the closure 9 should be more or less water-resisting so as not to permit moisture readily to enter the tire.

Figure 4:
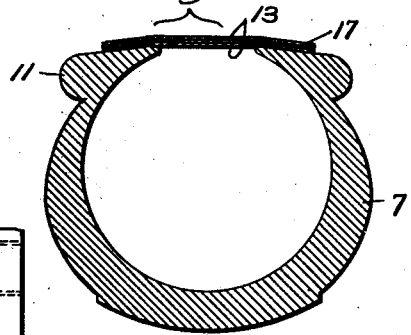
Fig. 4 is a similar section showing the tire under shock.
Figure 5:
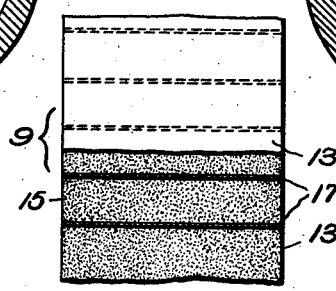
Fig. 5 is a view of a portion of a material suitable for use as a tire closure.

In Fig. 5 I have shown a suitable material for use in forming this closure, consisting of two strips 13 of paper secured together by a waterproof adhesive 15, such as asphalt, in which are embedded transverse reinforcing threads 17. When the strip is applied to the tire, as shown in Fig. 2, it may be adhesively secured to the bases of the beads 9 and the reinforcing threads will extend transversely across the space between the beads. When the tire shoe is dropped or otherwise subjected to shock, it flattens and the tendency is to spread the beads as shown in Fig. 4. In the coarse of shipment or handling incident to storage of the tire the beads will be subject to this spreading action many times and the threads will resist rupture of the closure.

Figure 3:
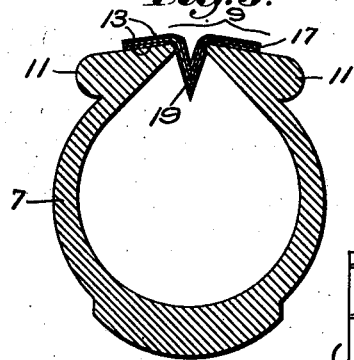
Fig. 3 is a section of the tire on an enlarged scale.

Preferably, moreover, to resist this action I provide for transverse expansion of the strip. Herein the middle portion of the strip between the beads is plaited to form a V-shaped or U-shaped portion 19 which may extend inwardly between the beads as shown in Fig. 2 and Fig. 3. When the tire flattens and the beads spread, this plait will straighten out as shown in Fig. 4 and no strain will be applied to the closure such as would be likely to rupture the same.

In Fig. 2 I have shown diagrammatically a suitable method of applying the closure to the tire. Therein a roll 21 is provided having a flange portion 23 corresponding in form to that of the groove or plait 19. The strip of material may be fed to the tire beneath the roll which will act to press the edges of the strip against the beads, securing them thereto by the action of suitable adhesive, and the flange portion will form the plait. The plait herein shown acts to position the closure on the inner circumference of the tire, preventing lateral displacement thereof.

It will be seen that by the use of my invention a tire is prepared for storage and shipment by the use of a minimum of material but that there is nevertheless provided a unit protected against possibility of the more series forms of damage. In the embodiment here shown the interior of the tire is hermetically sealed and the substantially waterproof closure forms, as it were, a continuation of the waterproof exterior of the tire so that the whole is a resistant unit. Obviously the embodiment here shown is illustrative merely and the essential idea of my invention might be incorporated in widely varying forms.

What I claim and desire to secure by Letters Patent is:—

1. As a unit for shipment or storage, in combination, a tire shoe and a protective strip of wrapping material encircling the inner circumference of the same, covering solely the inner portion of the tire and closing the space between the beads.

2. In combination, a tire shoe and a strip encircling the inner circumference of the same, adhesively secured to the beads and sealing the interior of the tire.

3. In combination, a tire shoe and a strip encircling the inner circumference of the same, adhesively secured to the beads and sealing the interior of the tire, said strip having provision for transverse expansion.

4. In combination, a tire shoe and a protective member overlying the beads at the inner circumference thereof and having a part projecting in between the beads for positioning the member.

5. In combination, a tire shoe and a protective strip encircling the inner circumference and sealed about the tire beads, said strip having a plait between the beads.

6. As a unit for shipment or storage, in combination, a tire shoe and an encircling sealing strip of substantially waterproof, paper-like material adhesively secured about the inner circumference thereof.

7. A tire closure comprising a strip of substantially waterproof paper-like material having a central plaited portion and lateral flange portions adapted to fit the beads of a tire when said plaited portion is applied between the same.

In testimony whereof, I have signed my name to this specification.

EDWARD H. ANGIER.